Sept. 11, 1951 M. F. SPEARS 2,567,582

MAGNETIC RECORDING AND REPRODUCING SYSTEM

Filed July 27, 1950

INVENTOR

Morton F. Spears

BY

Curtis, Morris + Safford

ATTORNEYS

Patented Sept. 11, 1951 2,567,582

UNITED STATES PATENT OFFICE 2,567,582

MAGNETIC RECORDING AND REPRODUCING SYSTEM

Morton F. Spears, Fairfield, Conn., assignor to Dictaphone Corporation, Bridgeport, Conn., a corporation of New York Application July 27, 1950, Serial No. 176,119

13 Claims. (Cl. 179—100.2)

Figures 1, 2:
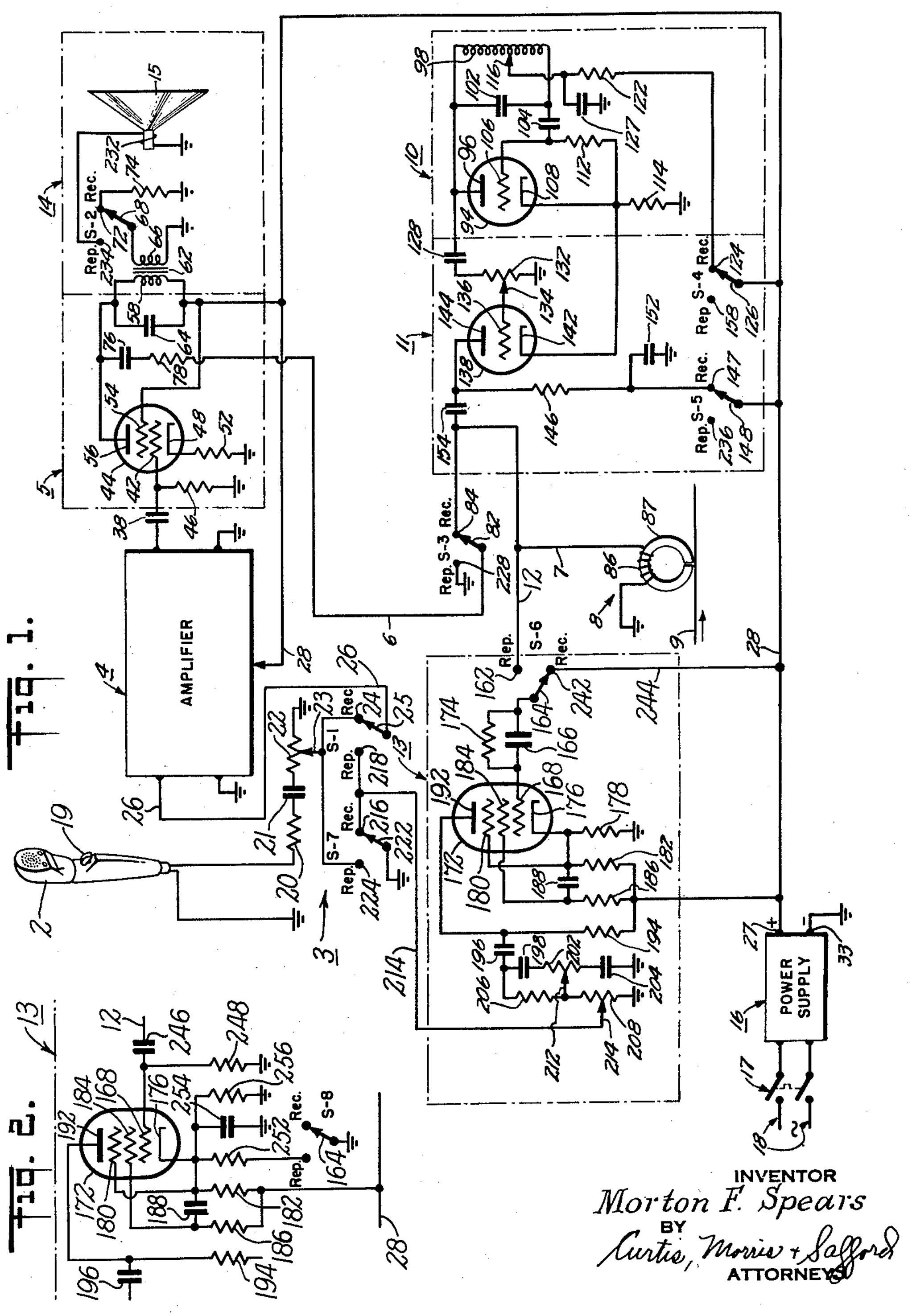

This invention relates to apparatus using magnetic records for recording and reproducing sound. It relates particularly to apparatus for improving the quality of sound reproduction in systems using a single translating unit or "head" for both recording and reproducing.

It is, of course, desirable to use the same head both for recording and reproducing whenever possible, rather than one head for recording and another for reproducing, because of the saving in space and cost. In such single-head arrangements, it is advantageous also to use a single magnetic circuit or core for carrying the magnetic flux during both the recording and reproducing operations, rather than two separate magnetic circuits mounted within the same housing, as this permits a further simplification with added saving in space and reduction in cost. The use of such a dual-purpose head is particularly important in dictating machines where the saving in space and the simplification of the head-supporting and moving structure are important advantages.

However, in a system having a common magnetic core for recording and reproducing, the bias signal, which is a signal of super-audible frequency commonly applied to the record medium simultaneously with the sound signal which is being recorded in order to improve the fidelity of the recording, may leave the magnetic core partially magnetized at the end of the recording operation and cause the reproduced signal to be distorted and accompanied by a "crackling" or background noise. If, at the time the head is switched from the recording to the reproducing circuit, this high frequency bias signal is suddenly interrupted, for example, by de-energizing the bias signal generator or disconnecting the circuit which couples it to the head, the core will usually be left partially magnetized, and this residual magnetism will remain in the core throughout the subsequent reproduction. The magnitude of this residual magnetism will depend upon the extent to which the core was magnetized at the instant the bias signal was interrupted, and even though this residual magnetism is small, it may be of sufficient magnitude to introduce a magnetic bias in the operation of the head as a reproducing unit, thus producing distortion and noise in the reproduced signal.

By carefully and properly annealing the magnetic core of the head, its magnetic characteristics can be made such that it will not retain sufficient residual magnetism to cause serious trouble. But, in quantity production, where cost and speed of production are major considerations, it is difficult to be certain that the characteristics of each core assembled into a recording head are satisfactory. Unsatisfactory operation may result because the core was improperly annealed in the first instance, or because the subsequent working of the metal of the core, which to some extent necessarily accompanies handling and assembly, may have changed the characteristics of the core material so that optimum magnetic characteristics are not obtained.

It has heretofore been proposed to remove any residual magnetism from the magnetic core each time the record-reproduce control lever of the machine is manipulated to switch the machine from recording to reproducing condition. For example, Taylor in application Serial No. 113,123, filed August 30, 1949, has described a system wherein the high frequency bias signal is attenuated gradually to zero at the end of each recording period so that no residual magnetism is left in the head by the bias signals.

I have found, however, that residual magnetism may be introduced into the magnetic core of the head by the action of the reproducing circuit at the instant the reproducing circuit is energized. This magnetization is caused by a transient flow of direct current through the winding of the record-reproduce head and which, although of very short duration, may cause sufficient magnetization that background noise will be present throughout the reproduction. With the most commonly used reproducing circuits, this would not occur if the process of demagnetizing the core at the end of each recording operation were entirely completed before initiating operation of the reproducing portion of the circuit. However, to insure that the bias signal is completely attenuated before starting the reproducer circuit, requires the use of sequential or delayed-action switching arrangements which are expensive to construct and troublesome to maintain. The illustrated embodiments of the present invention utilize electrical means for overcoming this difficulty and thus permit the use of ordinary snap-action switches for changing from recording to reproducing condition.

Accordingly, one feature of the present invention, which is in the nature of an improvement on the arrangement described by Taylor in the above-identified application, is directed to preventing magnetization of the magnetic core by transient currents flowing in the reproducing portion of the system. Still another aspect of the invention relates to the prevention of such magnetizing currents even though the reproducing circuits are operatively connected before the magnetic core is completely demagnetized, thus eliminating the need for complicated sequential, or mechanically delayed, switching arrangements.

Additional objects, aspects, and features of the invention will be in part pointed out in, and in part apparent from consideration of the following description considered in conjunction with the accompanying drawings in which:

Figure 1 shows, diagrammatically, the electrical circuits of a magnetic type recording-reproducing system embodying the invention; and Figure 2 shows a modification of a portion of the circuits shown in Figure 1.

The circuit diagram shown in the drawings is such as might be used in the magnetic-record type dictating machine, for example, the dictating machine described in U. S. patent application Serial No. 767,410. In this machine, a single head is utilized both for recording and reproducing.

When the apparatus is conditioned for recording, sound waves are picked up by a hand microphone 2 and converted into an electrical signal, which is fed through a switching arrangement, generally indicated at 3, into a conventional electronic audio-frequency amplifier, indicated in block form at 4. The output signal from amplifier 4 is fed into a power amplifier stage, generally indicated at 5, which further amplifies the signal and feeds it through leads 6 and 7 to a recording head, generally indicated at 8, which is arranged to record the signal on a moving magnetic record medium 9.

During the recording operation a high-frequency bias signal, produced by a signal generator, generally indicated at 10, passes through a coupling stage, generally indicated at 11, whose purpose will be explained later, and is applied to the recording head 8 simultaneously with the signal to be recorded from power amplifier stage 5.

When the apparatus is switched from record to reproduce condition, the bias-signal source is disconnected, in a manner to be explained later, and the signal induced in head 8 by the moving magnetic record 9 is fed, by a lead 12, into a pre-amplifier stage, generally indicated at 13, which is used only during reproduction because the relatively weak signal picked up by head 8 requires greater amplification than does the signal delivered by the microphone 2. The output signal from pre-amplifier 13 is fed through the switching arrangement 3, amplifier 4, and the power amplifier stage 5, as in recording, and the amplified signal is applied to an output circuit, generally indicated at 14, which includes a loudspeaker 15.

Power for this recording and reproducing apparatus is provided from a conventional rectifier-filter power supply, generally indicated in block form at 16, which is connected through a switch 17 to alternating current supply lines 18.

A plurality of switches S—1, S—2, S—3, S—4, S—5, S—6, and S—7, for changing the circuit from recording to reproducing condition, are shown in recording position. In practice, the switches are ganged together (either mechanically or electrically) and are controlled by a manually operable lever (not shown), such as that disclosed in the above-mentioned application, which conditions the machine for recording or reproducing.

The recording portion of the illustrated apparatus will now be described in greater detail. One terminal of the hand microphone 2, which is provided with a switch 19 (connections for which are not shown) for starting and stopping the machine, is connected to a common ground circuit and the other microphone terminal is connected through a resistor 20 and a coupling condenser 21 to one end of a potentiometer 22, which serves as a volume level control during recording. The opposite end of the potentiometer 22 is connected to ground and its sliding contact 23 is connected to contact point 24 of switch S—1, arm 25 of which is connected through a lead 26 to the input circuit of the audio amplifier 4.

Amplifier 4 is energized from the power supply 16, the positive terminal 27 of which is connected to the amplifier through a lead 28, the negative terminal 33 of the power supply 16 being connected thereto through the common ground circuit.

The output signal from amplifier 4 is fed through a coupling condenser 38 to a control grid 42 of a pentode amplifier tube 44 in the power amplifier stage 5, a ground return circuit being provided from grid 42 through a resistor 46. The cathode 48 of this tube is connected to ground through a bias resistor 52, the screen grid 54 is connected directly to the positive voltage lead 28, and the anode 56 is connected to lead 28 through a load circuit comprising a primary winding 58 of an audio-output transformer 62, connected in parallel with a stabilizer condenser 64. When the apparatus is in recording condition, as shown, the secondary winding 66 of the transformer 62 is connected through switch arm 68 and contact point 72 of switch S—2 and a dummy load resistor 74 to ground.

The audio signal developed across the anode load circuit of power amplifier tube 44 is fed through a coupling condenser 76, a series resistor 78, and arm 82 and contact point 84 of switch S—3 to the winding 86 of the recording-reproducing head 8, to induce correspondingly varying magnetic flux in its core 87.

The high frequency signal generator, or oscillator, generally indicated at 10, which provides the high-frequency bias signal that is applied to the recording head 8 simultaneously with the audio signal, comprises an oscillator tube 94, the anode 96 of which is connected to one end of a parallel resonant circuit comprising an inductance 98 and a parallel-connected condenser 102. The opposite end of this resonant circuit is connected through a condenser 104 to the control grid 106 of tube 94, and to its cathode 108 through a resistor 112, the cathode being connected to ground through a resistor 114. Positive voltage is provided for oscillator circuit 10 by a connection from a tap 116 on the coil 98, through a series resistor 122 and contact point 124 and arm 126 of switch S—4 to the positive voltage supply lead 28. A condenser 127, whose purpose will be explained later, is connected from the coil tap 116 to ground.

The signal produced by the signal generator 10 is applied from anode 96 of the oscillator tube 94 through a coupling condenser 128 to one end of a gain-control potentiometer 132, the opposite end of which is connected to ground. The adjustable contact 134 of the potentiometer 132 is connected to a control grid 136 of a triode amplifier tube 138 of the coupling stage 11. The cathode 142 of this tube is connected through the same resistor 114 to ground as is the cathode circuit of the oscillator tube 94. The anode 144 is connected through a plate load resistor 146, and contact point 147, and arm 148 of switch S—5 to the positive voltage supply lead 28. A condenser 152 is connected between contact point 147 and ground, and in conjunction with the resistor 146 forms part of a time-delay circuit whose function will be explained hereinafter.

The signal developed across load resistor 146 is coupled from the anode 144 of tube 138 through a condenser 154 to the winding 86 of the recording-reproducing head 8.

The coupling stage 11 between the signal generator 10 and the head 8 can be made either to amplify or to attenuate the high frequency bias signal produced by signal generator 10, dependent upon the desired operating condition, by suitable adjustment of the contact 134 of the potentiometer 132. The operation of this coupling stage will be discussed more fully later.

When the control lever (not shown) is switched from the recording to the reproducing position, all of the switches S—1 through S—7 are changed from the positions shown in the drawing to their alternate positions. The recording-reproducing head 8 now picks up the signal previously recorded on the magnetic record medium 9. This signal, which is induced in the winding 86 of the head 8, is fed through the lead 12, contact point 162 and arm 164 of switch S—6, and a coupling condenser 166 to a control grid 168 of a pentode vacuum tube 172 of the pre-amplifier stage 13, a grid-leak resistor 174 being connected in parallel with the condenser 166. The cathode 176 of this tube is connected to ground through a bias resistor 178. The switch S—6 renders this pre-amplifier stage inoperative during recording when it is not required.

The suppressor grid 180 of the pre-amplifier tube 172 is connected to its cathode 176, which is connected also to the positive supply lead 28 through a voltage-dropping resistor 182, and the screen grid 184 is connected to the positive supply lead 28 through a resistor 186 and is bypassed to the cathode 176 by a condenser 188. This pre-amplifier stage 13 is completed by a connection from anode 192 through a plate-load resistor 194 to the positive voltage supply lead 28.

The amplifier signal which appears at anode 192 is coupled through a condenser 196 to volume and tone control circuits, which comprise two parallel branches. The tone control circuit includes a condenser 198, a potentiometer 202, and a condenser 204 connected in series between condenser 196 and ground. The volume control circuit includes a resistor 206 connected in series with a potentiometer 208 between condenser 196 and ground. The sliding contact 212 of the tone control potentiometer 202 is connected to the junction of the resistor 206 and the potentiometer 208 in the volume control branch.

The sliding contact 214 of the reproducing volume control potentiometer 208 is connected to contact point 216 of switch S—7 and to contact point 218 of switch S—1. When the apparatus is in recording position, the arm 222 of switch S—7 connects the output of amplifier tube 172 to ground to prevent any noise, or other undesirable signals, from being impressed on the recording system. When the switches are in the reproducing position, arm 222 of switch S—7 is connected to its contact point 224, grounding the signal from microphone 2; the reproduced signal is applied through the contact point 218 and the arm 25 of the switch S—1 to the input circuit of the audio-frequency amplifier 4.

The circuits associated with the output of amplifier 4 function as described above in connection with the recording operation, except that the signal from power amplifier tube 44 is applied to the voice coil 232 of the loudspeaker 15 through the arm 68 and contact point 234 of the switch S—2, and no signal is applied to the head 8 through condenser 76, because arm 82 of the switch S—3 is now connected to terminal 228, which is grounded.

The operation of the above-described system during the recording process is similar to the conventional systems heretofore known. However, when the control lever (not shown) is moved to the reproduce position, the magnetic core 87 of the recorder-reproducer head 8 is automatically and positively demagnetized. In order to accomplish this, the gain of the coupling tube 138 is controlled, in this example by gradually reducing its plate voltage, so that the high-frequency bias signal appearing at anode 144 gradually decreases to zero.

When switch arm 148 of switch S—5 is moved from contact point 147 to contact point 236 (simultaneously with corresponding movement of all of the switches S—1 to S—7), the plate voltage is not removed instantly from coupling tube 138, because of the condenser 152, which has been charged to the full potential of the positive voltage supply lead 28. However, as the condenser 152 discharges through the resistor 146 and tube 138, the anode potential, and accordingly the amplitude of the bias signal passing therethrough is gradually decreased.

If the bias signals were stopped merely by de-energizing the signal generator 10, the oscillations would cease abruptly, after perhaps a small amount of attenuation, rather than dying out gradually in the desired manner. Moreover, irregular wave forms of considerable magnitude may be produced by the signal generator at its cessation of oscillation and thus leave a substantial amount of residual magnetism in the core 87 of head 8. Accordingly, the signal generator 10 is permitted to stop oscillating only after the coupling through the stage 11 has been suitably attenuated, by the gradual reduction of the anode voltage applied to the coupling tube 138. This is accomplished by providing the condenser 127 with a substantially larger capacity than the condenser 152, so that when switch arm 126 of switch S—4 is moved from terminal 124 to terminal 158, to disconnect the signal generator 10 from the positive voltage supply lead 28, the signal generator 10 is caused to continue oscillating for a period of time substantially longer than that required to discharge condenser 152, and transients or unusual wave forms occurring at the cessation of oscillations in signal generator 10, will not be impressed on winding 86. The period of time required for the demagnetization is, at most, a few hundred cycles, so that the whole operation can take place in a small fraction of a second.

Background noise on reproduction, however, can be caused also in systems of this type by transient direct currents which flow through the winding 86 of the head 8 at the instant the apparatus is switched from recording to reproducing condition and leave the core 87 partially magnetized even though it previously had been demagnetized by the gradual attenuation of the high-frequency bias signals.

This can be understood by examining the circuits of the tube 172 and assuming the resistor 174 to be connected from the grid 168 to ground and the switch S—6 to be in the cathode circuit of tube 172 and arranged to open that circuit during recording, all in accordance with usual practice, such as is shown, for example, in the above-mentioned Taylor application. If the high-frequency bias signal is not attenuated to zero level before the switch S—6 renders tube 172 operative, the bias signal will be applied to the control grid 168 through the coupling condenser 166 and cause grid current to flow during the positive half-cycles of the bias signal, thus charging the coupling condenser 166. When the bias signals have been further attenuated, the condenser 166 will discharge through the winding 86, leaving it partially magnetized. This magnetization will cause background noise throughout the reproducing cycle so that the full benefits of the previously-described attenuation circuits will not be obtained.

However, with the arrangement as shown in Figure 1, the grid 168 of the amplifier tube 172 is connected, during recording, to the positive voltage lead 28 through the high-value grid-leak resistor 174, switch arm 164 and contact point 242 of switch S—6, and lead 244.

This connection places a positive bias on the control grid 168 and permits a small amount of grid current to flow through the grid-leak resistor 174. The voltage drop across resistor 174 charges coupling condenser 166 so that the end of the condenser that is connected in the grid 168 is negative relative to the end connected to switch arm 164. When the switch arm 164 is moved to the reproduce position, the end of condenser nearest the switch S—6 is connected through the winding 86 to ground. If bias signals are still present at the time the arm 164 engages the contact point 162, these bias signals do not charge the condenser 166 because the grid is biased negatively with respect to ground by the charge already on the condenser 166. Moreover, the charge already on the condenser 166 cannot discharge through the winding 86, because no grid current can flow in tube 172 so long as its grid 168 is negative. The condenser 166, therefore, gradually discharges through the grid-leak resistor 174, so that the tube 172 becomes operative only after sufficient time that the bias signals have been attenuated to zero value.

An alternative arrangement for preventing residual magnetism caused by the transient flow of current from the reproducer portions of the system is shown in Figure 2. In this embodiment the lead 12 from the winding 86 is connected through a coupling condenser to the control grid 168 of tube 172, a grid return circuit being provided by a resistor 248 connected between the control grid 168 and ground. A switch S—8 (which replaces the switch S—6 of Figure 1) is in the cathode circuit of the tube 172 and connects the cathode bias resistor 252 through its arm 164 to ground when the apparatus is in reproducing condition, but disconnects the cathode circuit from ground when the apparatus is in recording condition. A condenser 254 of relatively large value, for example 10 microfarads, and a resistor 256, of large value relatively to the value of the bias resistor 252, for example 300,000 ohms, are connected in parallel between the cathode 176 and ground.

During the recording operation, the cathode bias circuit of tube 172 is open-circuited by the switch S—8, but the cathode 176 is connected to the junction of the resistor 182, for example of 300,000 ohms, and the resistor 248, which form a voltage divider circuit between the positive voltage lead 28 and ground. Thus, the cathode 176 is maintained at a positive potential relatively to ground and the control grid 168, which is at ground potential, is highly negative relative to the cathode 176, so that no grid current flows in the tube during the recording operation. Grid current is also prevented for a short interval of time after the apparatus is switched to the reproducing position because, even though switch arm 164 connects the cathode resistor 252 to ground, the positive voltage at the cathode 176 is maintained by the large condenser 254, thus preventing the bias signals, even though they are still present at the time the apparatus is switched to the reproducing position, from charging the coupling condenser 246. As soon as the condenser 254 has discharged through the cathode resistor 252, the tube 172 is rendered operative, at which time the bias signals have been attenuated to zero or to such a low level that no harmful effects result from them.

Thus, it will be seen that the above-described embodiments of this invention are well adapted to carry out the ends and objects hereinbefore set forth. It is apparent that the structure can be modified so as to best suit the needs of a particular use. It is to be understood, therefore, that the examples set forth above are for the purpose of teaching those familiar with this art the principles of the present invention and how to apply them for their particular uses, and is not intended to be limiting of the invention or to be an exhaustive analysis of all its possible forms or uses.

What is claimed is:

1. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, circuit means coupling said input stage to said magnetic circuit, means rendering said input stage inoperative during the recording operation, and time delay means responsive to the changing of said system from recording to reproducing condition arranged to initiate operativeness of said input stage only after a predetermined time interval.

2. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, circuit means coupling said input stage to said magnetic circuit, switch means responsive to the changing of the operation of said system between recording and reproducing conditions for rendering said input stage inoperative during recording and operative during reproduction, and time delay means under the control of said switch means for preventing the operation of said first stage for a predetermined time interval after the changing of said system from recording condition.

3. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, circuit means coupling said input stage to said magnetic circuit, a time delay circuit including a condenser and a resistive discharge circuit therefor, means for rendering said input stage inoperative during the recording operation, means responsive to the changing of said system from recording to reproducing condition arranged to initiate the discharge of said condenser, and means under the control of said condenser for rendering said input stage operative only upon the completion of the discharge of said condenser.

4. In a magnetic recording and reproducing system in which the same magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube, circuit means coupling said vacuum tube to said magnetic circuit, means rendering said input stage operative during reproducing operation, and time delay means responsive to the changing of said system from recording to reproducing condition arranged to retard the flow of plate current in said vacuum tube for a predetermined time interval after said changing.

5. In a magnetic recording and reproducing system in which the same magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube having a cathode and a control grid, circuit means coupling the control grid of said vacuum tube to said magnetic circuit, time-delay means including a condenser and a discharge circuit therefor, means for charging said condenser during the recording operation, connecting means coupling said condenser to said tube so as to apply its potential between said cathode and control grid with such polarity as to substantially prevent the flow of plate current in said tube, and means responsive to the changing of said system from recording condition arranged to reduce the potential applied to said condenser to permit it to discharge through said discharge circuit a predetermined time interval after the system is changed from recording condition.

6. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube having at least one control element, circuit means coupling a control element of said vacuum tube to said magnetic circuit, a time-delay circuit connected to a control element of said tube and including a condenser and a discharge circuit therefor, a source of potential connected to said time-delay circuit and arranged to charge said condenser, switch means rendering said vacuum tube inoperative during the recording operation, means connecting said condenser to said vacuum tube so that the potential on said condenser tends to prevent the flow of plate current in said tube, and means responsive to the changing of said system from recording to reproducing condition for rendering said vacuum tube operative and being arranged to reduce the voltage applied to said condenser by said potential source to permit said condenser gradually to discharge whereby said vacuum tube is rendered operative only after a predetermined interval after the changing of the system to reproducing condition.

7. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube having at least one control element, circuit means coupling a control element of said vacuum tube to said magnetic circuit, a time-delay circuit including a condenser and resistor in shunt therewith connected to a control element of said tube, a source of potential connected to said time-delay circuit and arranged to charge said condenser, means rendering said vacuum tube inoperative during the recording operation, and means responsive to the changing of said system from recording to reproducing condition for disconnecting said potential source from said condenser to permit said condenser gradually to discharge whereby said vacuum tube is rendered operative only after a predetermined interval after the changing of the system to reproducing condition.

8. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube having a cathode and at least one control element, circuit means coupling a control element of said vacuum tube to said magnetic circuit, a time-delay circuit including a resistor and condenser connected to the cathode of said tube, switch means interrupting the cathode circuit of said tube to render it inoperative during the recording operation, a source of potential, resistance means connecting said potential source to said time delay circuit and arranged to charge said condenser when the cathode circuit of said tube is interrupted, and means responsive to the changing of said system from recording to reproducing condition for completing said cathode circuit to render said vacuum tube operative only after said condenser has substantially discharged through said resistor.

9. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit through the reproducing circuits including a reproducing amplifier having input and output stages, circuit means coupling said input stage to said magnetic circuit, a time-delay circuit including an energy storage device and a discharge circuit therefor, means for charging said storage device during the recording operation, means responsive to the changing of said system from recording to reproducing condition arranged to initiate the discharge of said device, and means under the control of said storage device for rendering said input stage inoperative while said device remains charged.

10. In a magnetic recording and reproducing system in which the same magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube, circuit means coupling said vacuum tube to said magnetic circuit, means rendering said input stage operative during the reproducing operation, and time delay means responsive to the changing of said system from recording condition arranged to retard the flow of the plate current in said vacuum tube for a predetermined time interval after changing from recording condition, said time interval being at least of a duration substantially equal to the period of attenuation of said bias signals.

11. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, circuit means coupling said input stage to said magnetic circuit, a time-delay circuit including an energy storage device and a discharge circuit therefor, means for charging said storage device during the recording operation, means responsive to the changing of said system from recording to reproducing condition arranged to initiate the discharge of said device, means under the control of said storage device for rendering said input stage inoperative while said device remains charged, the delay time of said time-delay circuit being at least equal to the time required for the attenuation of the high frequency bias signal at the end of the recording period.

12. In a magnetic recording and reproducing system in which a common magnetic circuit of a recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a reproducing amplifier having input and output stages, said input stage including a vacuum tube having a control grid, means for changing said system between recording and reproducing conditions including a switch having a reproducing and a recording position, a source of positive potential, a time-delay circuit including a condenser and resistor connected in parallel with each other and between said control grid and said switch, said switch being arranged to connect said time-delay circuit to said magnetic circuit when in said reproducing position and to said source of potential when in said recording position, whereby when the system is changed from recording to reproducing condition, the charge on said condenser prevents operation of said tube until said condenser has substantially discharged through said resistor, the time required for discharge of said condenser being at least as long as the time required to attenuate said bias signals substantially to zero level.

13. In a magnetic recording and reproducing system in which a common magnetic circuit of recording-reproducing head is utilized both for recording and for reproducing, and in which a high-frequency bias signal is applied to the magnetic circuit during recording and gradually attenuated in magnitude at the end of the recording period to demagnetize the magnetic circuit, apparatus for preventing re-magnetization of the magnetic circuit by the reproducing circuits including a power supply having positive and negative terminals, a reproducing amplifier having input and output stages, said input stage including a vacuum tube having a cathode and a control grid, a circuit coupling said control element to said magnetic circuit, means for changing said system from reproducing to recording condition including a switch, a condenser connected between said cathode and said negative terminal, a resistor connected between said cathode and said switch, said switch being arranged when in its reproducing position to connect said resistor to said negative terminal and to disconnect it therefrom when in its recording position, a circuit containing series resistance connecting said positive power supply terminal to said cathode and arranged to charge said condenser to a first potential when said switch is in its recording position and to a lower potential when said switch is in its reproducing position, whereby the charge on said condenser renders said tube inoperative for the period of time required for said condenser to discharge from said first to said second potential following the changing of said system from recording to reproducing condition, the time required for the discharge of said condenser being at least as great as the time interval during which said bias signal is attenuated to substantially zero value.

MORTON F. SPEARS.

No references cited.